United States Patent [19]

Otto

[11] Patent Number: 4,691,560
[45] Date of Patent: Sep. 8, 1987

[54] METHOD AND APPARATUS FOR THE PERFORMANCE TESTING OF THE ENGINE OF A SHIP WHILE THE ENGINE IS INSTALLED IN THE HULL OF A SHIP

[75] Inventor: Wilheim Otto, Seevetal, Fed. Rep. of Germany

[73] Assignee: Blohm & Voss AG, Hamburg, Fed. Rep. of Germany

[21] Appl. No.: 804,278

[22] Filed: Dec. 3, 1985

[30] Foreign Application Priority Data

Dec. 4, 1984 [DE] Fed. Rep. of Germany ....... 3444164

[51] Int. Cl.⁴ ............................................... G01L 5/13
[52] U.S. Cl. ...................................................... 73/116
[58] Field of Search ................. 73/117.1, 432 SD, 116

[56] References Cited

U.S. PATENT DOCUMENTS

| | | |
|---|---|---|
| 3,487,426 | 12/1969 | Hoffmann ........................... 73/117.1 |
| 3,543,573 | 12/1970 | Hunziker ............................ 73/117.1 |
| 4,050,848 | 9/1977 | White ................................... 416/146 |
| 4,071,898 | 1/1978 | Schorsch et al. ................... 364/551 |
| 4,142,829 | 3/1979 | Inoue et al. ............................ 416/25 |
| 4,150,921 | 4/1979 | Wennberg et al. ................. 416/207 |
| 4,188,906 | 2/1980 | Tachmindji et al. ................ 115/34 |
| 4,324,134 | 4/1982 | Carlsson ............................ 73/117.1 |
| 4,436,482 | 3/1984 | Inoue et al. ............................. 416/1 |
| 4,474,533 | 10/1984 | Hino ................................... 416/157 |

FOREIGN PATENT DOCUMENTS

| | | | |
|---|---|---|---|
| 1119713 | 12/1961 | Fed. Rep. of Germany ........ 73/116 |
| 8484 | 1/1983 | Japan ..................................... 73/116 |
| 493692 | 2/1976 | U.S.S.R. ............................ 73/117.1 |
| 47805 | 5/1978 | U.S.S.R. ............................ 73/117.1 |

Primary Examiner—Stewart J. Levy
Assistant Examiner—Robert R. Raevis
Attorney, Agent, or Firm—Nils H. Ljungman

[57] ABSTRACT

A method and apparatus for the performance testing of a ship's engine while the ship is moored in a harbor, and even when the ship is being refitted or before the ship is completely built. To facilitate stationary testing of the ship's engine, a zero-thrust controllable-pitch propeller substitute, designed in the manner of a water-braking device, is installed. The propeller substitute attaches to the propeller shaft of the ship and replaces the regular controllable-pitch propeller during testing. The water-braking device has controllable a drag which can be adjusted to correspond to the engine output, and is preferably designed to accept the controls and fittings of the regular propeller. The water-braking device produces substantially zero thrust on the propeller shaft and the hull of the ship at all speeds of operation thereof, thereby producing far less currents at the site of the mooring of the ship during testing than the prior art methods.

20 Claims, 3 Drawing Figures

METHOD AND APPARATUS FOR THE PERFORMANCE TESTING OF THE ENGINE OF A SHIP WHILE THE ENGINE IS INSTALLED IN THE HULL OF A SHIP

CROSS REFERENCE TO CO-PENDING APPLICATION

Co-pending application Ser. No. 733,869, filed on May 14, 1985, entitled "Apparatus For Adjusting And Locking Pitch Of A Variable Pitch Propeller On A Ship", is assigned to the same assignee as the instant application and is incorporated herein by reference as if fully set forth herein.

BACKGROUND OF THE INVENTION

1. Field of the Invention:

The invention relates to a method and apparatus for testing ship's engines and, more particularly, to a method and apparatus for testing the performance of the engine of a ship while the engine is installed in the hull of a ship.

2. Description of the Prior Art:

Tests are performed on the engine of a ship generally during a preliminary trial run at sea, which testing requires a time consuming adjustment of the engine of the ship. This traditional performance testing requires a substantial amount of time and typically protracts the preliminary trial or shake-down run, thereby increasing its expense substantially.

There has been a need for the testing of the ship's engine prior to the trial run at a location and during a period of time when equipment, personnel, and even spare parts are readily available and can be provided within a very short time during the testing of the engine.

Attempts have been made to use so-called stationary testers or testing techniques in a harbor, such as where the ship is moored. Such stationary tests are typically run in a facility specially designed to provide for the mooring of the ship and also to accept the very strong propeller currents generated thereby. Even with the provisions of a special facility of this type, the performance tests on the engine can typically only be run in the lower range of engine speeds and therefore only provide a very limited amount of data and testing compared to the preliminary trial or shake-down run at sea. Therefore, the prior art stationary testing methods and apparatus were not an ideal substitute for the trial or shake-down run at sea, in which runs the engine or engines could be tested over a wide range of engine speeds and loads.

Some examples of prior art relating to the general field of shipping are found in U.S. Pat. No. 4,142,829, issued on Mar. 6, 1979, entitled "Compound Remote Control Device for the Propulsion Engine of a Ship's Variable-Pitch Propeller", and U.S. Pat. No. 4,071,898, issued on Jan. 31, 1978, entitled "Ship Performance Analyzer". The contents of the aforementioned patents are incorporated herein by reference.

OBJECTS OF THE INVENTION

An object of the invention is, therefore, to provide a method of testing the engine or engines of a ship while that ship is stationary when at a mooring or a dock.

It is another object of the invention to provide an apparatus for the testing of an engine or engines over a wide range of operating speeds and loads during this stationary test at the dock.

It is a further object of the invention to provide apparatus for testing an engine or engines of a ship which will substitute for the ship's propeller during the tests.

It is a yet further object of the invention to provide a testing apparatus which can be controlled by the variable pitch control system of the propeller designed for operating the ship at sea.

It is a still further object of the invention to provide a replacement, test controllable pitch propeller which can be substituted for a regular propeller and which generates substantially zero thrust during operation.

It is yet another object of the invention to provide an engine brake apparatus which can be adjusted to correspond to the desired output of the ship's engine.

It is still another object of the invention to eliminate a substantial portion of the trial run at sea of a ship for purposes of testing the engine.

It is another yet further object of the invention to save time in the testing of the engine or engines of a ship, both during building and refitting.

It is a still yet further of the invention to reduce the cost of the preliminary trial run of the engine or engines of a ship.

It is yet another object of the invention to test and/or refit the engine of a warship during wartime, thereby saving substantial amounts of combat time.

It is a still yet further object of the invention to provide an engine braking apparatus which can be controlled by the control and fittings of the regular controllable pitch propeller.

SUMMARY OF THE INVENTION

The present invention relates to a water braking device which attaches to the propeller shaft of a ship. The engine can thus be tested while the ship is moored in a harbor, and even when the ship is being refitted or before the ship is completely built.

The braking device, which replaces the regular propeller during testing, is preferably designed to accept the controls and fittings of the regular controllable pitch propeller during this testing phase. The variable pitch propeller produces substantially zero thrust on the propeller shaft and the hull of the ship at all speeds of operation of the propeller, thereby producing far less currents at the site of the mooring of the ship and virtually no thrust on the moorings thereof as well. Further, the specially designed facility for mooring of the ship during testing is also eliminated at a substantial cost savings.

The hub design and controls of the controllable-pitch rotary brake of the invention is substantially similar to the hubs of controllable-pitch propellers as known in the prior art. Drag plates are preferably provided which preferably have a substantially flat portion for interaction with the water thereabout. The flat surfaces of the drag plates are preferably substantially aligned with a longitudinal axis of the propeller shaft, about which it rotates. These drag plates are extendible and retractable, preferably in the direction of the longitudinal axis of the propeller shaft.

The embodiment of the invention described herein preferably has a circular ring member which is in the shape of a circular cylinder, that protects and preferably partially supports, in part, the drag plates which produce the braking effect on the propeller shaft in operation.

The invention resides broadly in an apparatus for performance loading of an engine of a deep water ship having a hull and a propeller shaft extending from the hull. The apparatus is for testing the performance of the engine when installed in the hull of the ship and when the propeller shaft is surrounded by water. The apparatus comprises a hub portion for being mounted on the propeller shaft of the ship at a portion thereof substantially where a propeller is mounted during operation of the ship on a body of water and when the propeller is driven by the propeller shaft. A drag arrangement is provided for producing a drag when the hub is rotating and driven by the propeller shaft. The drag arrangement is firmly attached to the hub means, and the hub means drives the drag arrangement through the water around the propeller shaft when rotated by the propeller shaft.

There is also provided control means connected to and for adjusting, by extending and withdrawing, the drag arrangement, thereby to increase and decrease drag respectively of the drag arrangement during operation, and to load the ship's engine even when the ship is substantially stationary.

The drag arrangement has at least one surface which interacts with water about the propeller shaft to produce drag during operation. This surface is disposed in operation to produce substantially, solely, a torque about the propeller shaft, and has means for substantially reducing any thrust developed by the surface to a minimum.

Additionally, there is provided control means for adjusting said drag arrangement to selectively increase and decrease the drag on the propeller shaft and thereby to selectively vary the load on the engine during operation.

BRIEF DESCRIPTION OF THE DRAWINGS

These and further objects and features of the present invention will become more apparent from the following description and the accompanying drawings, in which.

DESCRIPTION OF THE PREFERRED EMBODIMENT

Figure 1:
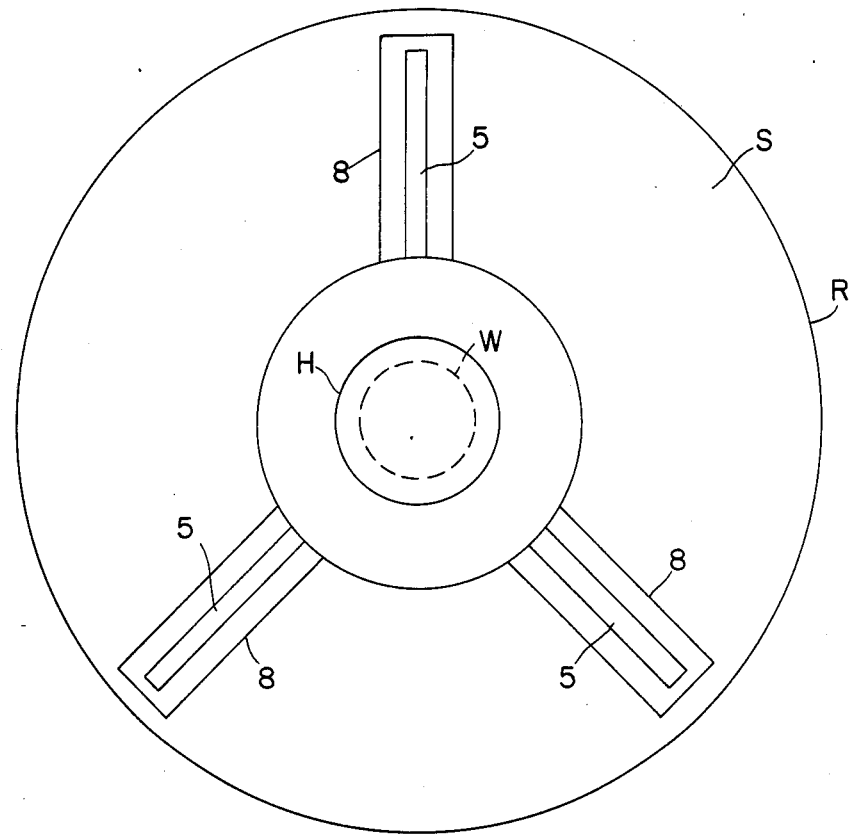
FIG. 1 represents a schematic rear view of the propeller shaft braking apparatus according to the invention.

FIG. 1 shows the braking arrangement from the rear as it is mounted on the propeller shaft W of the ship (not shown). The hub H is mounted and attached to the propeller shaft W. From the hub H, preferably three units project, on which braking plates 5 are attached. The number of units may be greater or less than three. Preferably, through circular plates S, braking plates 5 protrude when extended through slots 8. Braking plates 5 extend from the hub H to a ring structure R. About the braking plates 5, the ring structure R is disposed which is described and shown in greater detail in FIG. 2.

Figure 2:
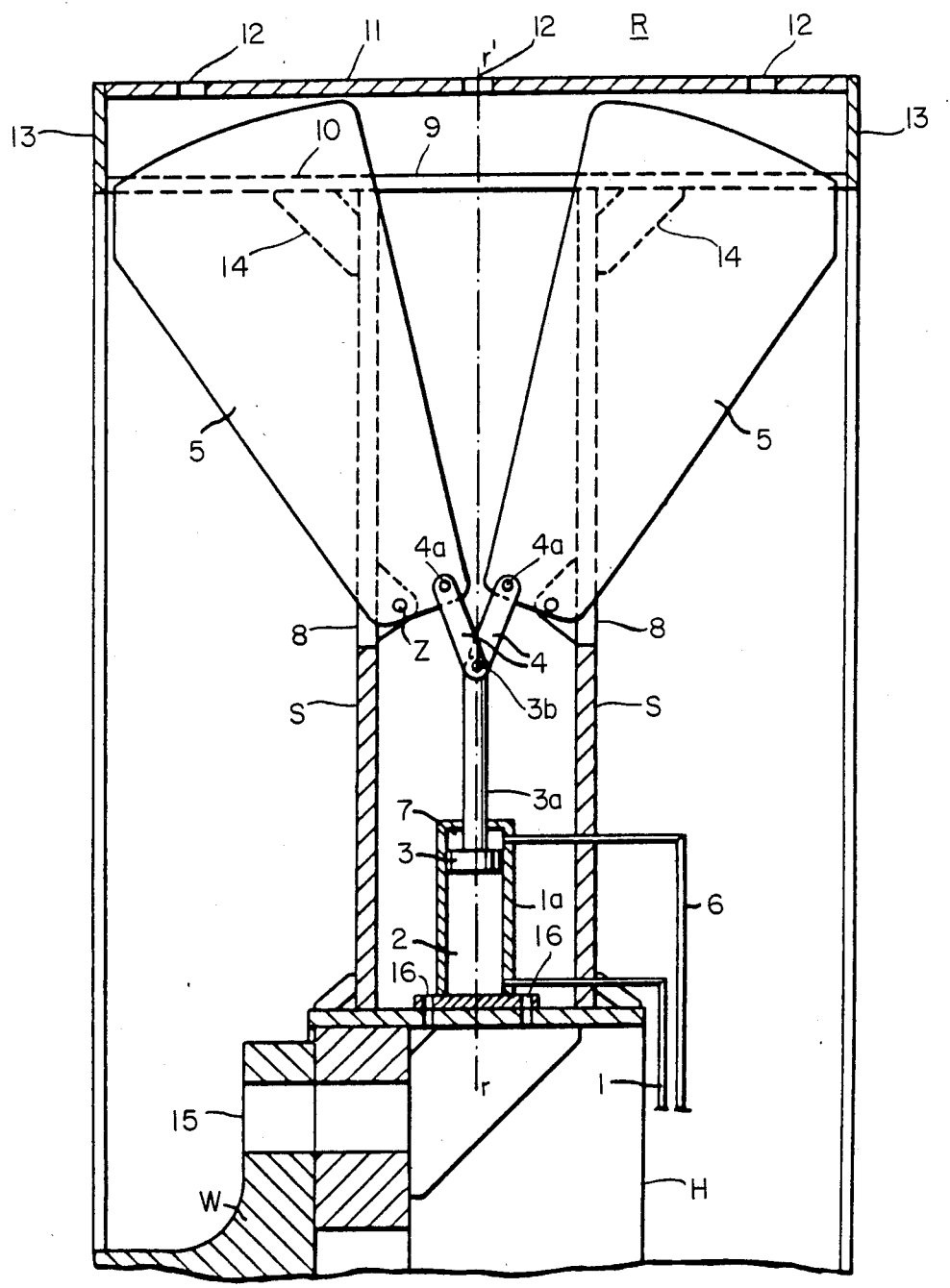
FIG. 2 shows a detailed view of a partial cross section of a portion of the apparatus of FIG. 1 according to the invention.

FIG. 2 shows a partial section of the ring structure R and the hub H with its associated braking or drag plates 5. Although only three sets of plates have been shown, there may be any number of sets of drag plates 5, which are disposed in such a way that no undue vibrations are produced during operation. Within the unit, which is attached to the hub H and the propeller shaft W, preferably by the same means that the regular propeller is attached to the propeller shaft W, a hydraulic feed line 1, shown schematically, is attached to a hydraulic cylinder 1a. The hydraulic cylinder 1a has a hydraulic cylinder chamber 2 connected to the hydraulic feed line 1 for supplying the hydraulic cylinder chamber 2 with hydraulic fluid under pressure. Within the hydraulic cylinder chamber 2, there is disposed a piston 3 which has a piston rod 3a attached thereto. At the end of the piston rod 3a opposite the piston 3, a connecting point 3b is provided for connection to preferably a pair of levers 4 attached by means of preferably pins or bolts (not shown in detail) to the connecting point 3b of the piston rod 3a. At an end of the levers 4 opposite the connecting point 3b, another attachment point 4a is provided, with attachment point 4a is connected to its corresponding braking or drag plate 5. In the embodiment of FIG. 2, two drag plates 5 are controlled by one piston 3. Each of the drag plates 5 has a lever 4 connected from the piston rod 3a for control thereof. As the piston rod 3a moves upwardly in FIG. 2, the drag plates 5 will move outwardly, being pivoted around pivot points Z. In order to lower the piston 3 and retract the drag plates 5, a second hydraulic feed line 6, shown schematically, provides hydraulic fluid for the retraction of the drag plates 5. The hydraulic feed line 6 is connected to supply hydraulic fluid to a second hydraulic cylinder chamber 7, which is disposed, in FIG. 2, above the piston 3. Circular plates S are disposed forwardly and aft of the hydraulic cylinder 1a and form a space thereinbetween, which contains the drag plates 5 at least partially when retracted. When the drag plates 5 are disposed between the circular plates S, the drag plates 5 no longer drag through the water thereabout, but are immersed in water between the circular plates S which rotates a substantial fashion with the braking device. The circular plates S preferably have slots 8 therein for the drag plates 5 to be retracted and extended therethrough. The pivot point Z is preferably attached to its corresponding circular plate S. At the periphery of the circular plates S, the ring structure R is attached. The ring structure R preferably has an internal cylindrical ring 9 with a slit or a pair of slots 10 therein which permit the drag plates 5 to retract and be extended within the ring structure R, at least at the upper portion thereof, as shown in FIG. 2. The drag plates 5 are preferably disposed so that their larger, preferably flat, surfaces are disposed at right angles or flat towards the direction of movement thereof about the propeller shaft W. However, other shapes and angles of disposal of the drag plates 5 are within the purview of the invention, which will generate substantially no thrust during operation. Disposed about this internal cylindrical ring 9 is an outer cylindrical ring 11 which is spaced coaxially outside the internal cylindrical ring 9. In this outer cylindrical ring 11, there are disposed orifices 12 for permitting the flow of water therethrough. Between the cylindrical rings 9 and 11, there are disposed preferably annular rings 13 which are attached to the circular plate S. The internal cylindrical ring 9 is attached to the circular plate S, preferably by welding, and by additional angle pieces 14 connected therebetween. The hub H is preferably bolted by means of bolts 15 to the propeller shaft W. The hydraulic cylinder 1a is preferably bolted by means of bolts 16 to the hub H. The attachment points 3b and 4a and the pivot points Z are preferably attached by bolting or by some other means well known in the prior art for fastening elements rotatably together, such as pins. A center line r—r' is shown, which extends through the center of the hydraulic cylinder 1a and the piston rod 3a, and is shown to extend to the periphery of the ring structure R.

In operation, as the drag plates 5 extend from between and out of the circular plates S, water thereabout generates a drag force on the drag plates 5, such that the energy developed by the engines in the ship and transmitted by the propeller shaft W is absorbed by viscous damping in the water and possibly also the environs of the aft portion of the ship. The slots 8 and 10 have sides which may support the drag plates 5 during operation when substantial forces are generated which may bend the plates. The preferably flat drag plates 5 are made of sufficiently heavy material so that they do not distort unduly during full load and partial load operation. However, if large strains are produced on the drag plates 5, the sides of the slots 8 and 10 will form supporting members which support the drag plates 5. The widths of the slots 8 and 10 are chosen to allow the drag plates 5 to move freely therethrough when rotated about the pivot points Z.

Alternatively, a threaded spindle may be attached to be used to adjust the extent of extension of the drag plates 5.

Figure 3:
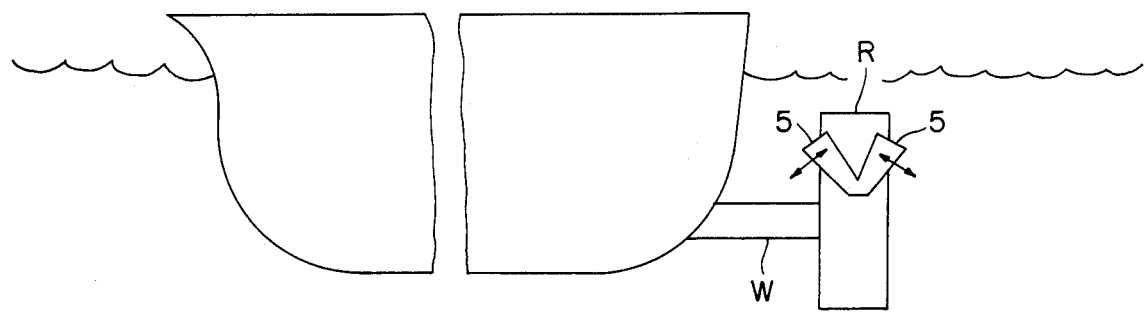
FIG. 3 shows a schematic side view of a ship with the apparatus of FIGS. 1 and 2 installed.

FIG. 3 shows the drag plates 5 in the apparatus installed on a propeller shaft W extending from a hull of a ship in water. The drag plates or blades 5 are extendible and retractable in the directions indicated by the double-headed arrows.

The invention as described hereinabove in the context of a preferred embodiment is not to be taken as limited to all of the provided details thereof, since modifications and variations thereof may be made withou departing from the spirit and scope of the invention.

What is claimed is:

1. Apparatus for performance loading of an engine of a deepwater ship having a hull and a propeller shaft extending from said hull, said apparatus for testing the performance of said engine when said engine is installed in said hull of said ship and when said propeller shaft is surrounded by water, said apparatus comprising:
    a hub portion for being mounted on said propeller shaft of said ship at a position on said propeller shaft substantially where a propeller of said ship is mounted during operation of said ship on a body of water when said propeller is driven by said propeller shaft;
    drag means for producing a drag when said hub is rotating and driven by said propeller shaft, said drag means being firmly attached to said hub, said hub driving said drag means through said water about said propeller shaft when rotated by said propeller shaft;
    said drag means having at least one surface which interacts with water about said propeller shaft to produce said drag during operation, said drag means having a position of minimum drag, said drag means being extendable from said position of minimum drag to increase drag of said drag means; and
    control means connected to and for adjusting said drag means to extend said drag means from said position of minimum drag and to withdraw said drag means to said position of minimum drag, thereby to increase and decrease drag respectively of said drag means during operation and to load said engine of said ship even when said ship is substantially stationary;
    said at least one surface being disposed in operation to produce substantially, solely, a torque about said propeller shaft;
    said at least one surface arranged for substantially reducing any thrust on said propeller shaft developed by said apparatus to a minimum;
    said control means for adjusting said drag means to selectively increase and decrease torque on said propeller shaft and thereby to selectively vary the load on said engine during operation.

2. The apparatus according to claim 1 wherein said drag means comprises at least one blade having said at least one surface thereon;
    wherein said at least one blade has a withdrawn position for producing minimum drag and being extendable from said minimum drag position for increased drag during operation;
    wherein said control means being for adjusting said drag to match a power level delivered by said engine, whereby said drag is adjusted during testing operation.

3. The apparatus according to claim 2 including a threaded spindle disposed to control the extension of said at least one blade.

4. The apparatus according to claim 3 wherein said at least one blade comprises drag blade groups which are each distributed substantially at equal angles one group from the other around said hub.

5. The apparatus according to claim 2 wherein said propeller shaft has a longitudinal axis and wherein said at least one blade comprises a plurality of drag blades having major surfaces being disposed in operation substantially parallel to said longitudinal axis of said propeller shaft.

6. The apparatus according to claim 5 including a threaded spindle disposed to control the extension of said drag means.

7. The apparatus according to claim 6 wherein said plurality of drag blades comprise drag blade groups which are each distributed substantially at equal angles one group from the other around said hub.

8. The apparatus according to claim 5 wherein said drag means further comprises:
    a cylindrical means having a longitudinal axis substantially colinear and concentric with said longitudinal axis of said propeller shaft when installed;
    means connecting said cylindrical means with said hub portion;
    said drag blades being disposed at least partially in said cylindrical means;
    pivot means disposed within said cylindrical means;
    each said drag blade having a corresponding pivot means;
    each said drag blade being pivoted about its corresponding pivot means, whereby said drag blades are extendable from and are withdrawable within said cylindrical means.

9. The apparatus according to claim 8 including a threaded spindle disposed to control the extension of said drag means.

10. The apparatus according to claim 9 wherein said plurality of drag blades comprise drag blade groups which are each distributed substantially at equal angles one group from the other around said hub.

11. The apparatus according to claim 8 wherein said control means comprise hydraulic cylinders connected to pivot said drag blades about their respective pivot means.

12. The apparatus according to claim 11 wherein said drag blades are disposed in pairs, one of said pair extending in one direction and the other of said pair extending in a substantially opposite direction to said one blade of said pair.

13. The apparatus according to claim 12 wherein said pairs of drag blades are each distributed substantially at equal angles one pair from the other around said hub.

14. The apparatus according to claim 11 wherein said plurality of drag blades comprise drag blade groups which are each distributed substantially at equal angles one group from the other around said hub.

15. The apparatus according to claim 11 including levers connected between each said hydraulic cylinder and its corresponding drag blades.

16. The apparatus according to claim 15 wherein said drag blades are disposed in pairs, a first of said pairs extending in one direction and a second of said pairs extending in a substantially opposite direction to said first of said pairs.

17. The apparatus according to claim 16 wherein said pairs of drag blades are each distributed substantially at equal angles one pair from the other around said hub.

18. The apparatus according to claim 15 wherein said plurality of drag blades are each distributed substantially at equal angles one to the other around said hub.

19. The apparatus according to claim 1 including a threaded spindle disposed to control the extension of said drag means.

20. The apparatus according to claim 19 wherein said drag means comprise a plurality of drag blade groups which are each distributed substantially at equal angles one group from the other around said hub.

* * * * *